US008613387B1

(12) United States Patent
Billett et al.

(10) Patent No.: US 8,613,387 B1
(45) Date of Patent: *Dec. 24, 2013

(54) BANKING SYSTEM CONTROLLED REPONSIVE TO DATA BEARING RECORDS

(75) Inventors: Nick Billett, Massillon, OH (US); Charles E. Crallie, Akron, OH (US); Richard Harris, Warshash (GB); Andrew Clugston, Canton, OH (US); Anne Konecny, Uniontown, OH (US); Tim Crews, Alliance, OH (US); Judith Edwards, Canton, OH (US)

(73) Assignee: Diebold Self-Service Systems, division of Diebold, Incorporated, North Canton, OH (US)

( * ) Notice: Subject to any disclaimer, the term of this patent is extended or adjusted under 35 U.S.C. 154(b) by 76 days.

This patent is subject to a terminal disclaimer.

(21) Appl. No.: 13/335,017

(22) Filed: Dec. 22, 2011

Related U.S. Application Data

(63) Continuation-in-part of application No. 12/802,496, filed on Jun. 8, 2010, now Pat. No. 8,123,123, which is a continuation of application No. 11/421,120, filed on May 31, 2006, now Pat. No. 8,100,323, which is a continuation-in-part of application No. 10/746,276, filed on Dec. 26, 2003, now abandoned.

(60) Provisional application No. 60/436,883, filed on Dec. 26, 2002, provisional application No. 60/436,784, filed on Dec. 26, 2002, provisional application No. 60/436,780, filed on Dec. 26, 2002, provisional application No. 60/436,882, filed on Dec. 26, 2002, provisional application No. 60/436,779, filed on Dec. 26, 2002, provisional application No. 60/436,719, filed on Dec. 26, 2002, provisional application No. 60/436,908, filed on Dec. 26, 2002, provisional application No. 60/436,832, filed on Dec. 26, 2002, provisional application No. 60/436,831, filed on Dec. 26, 2002, provisional application No. 60/487,754, filed on Jul. 15, 2003, provisional application No. 60/687,132, filed on Jun. 3, 2005, provisional application No. 60/687,176, filed on Jun. 3, 2005, provisional application No. 60/687,175, filed on Jun. 3, 2005, provisional application No. 60/687,268, filed on Jun. 3, 2005, provisional application No. 60/687,263, filed on Jun. 3, 2005, provisional application No. 60/687,131, filed on Jun. 3, 2005, provisional application No. 60/687,571, filed on Jun. 3, 2005, provisional application No. 61/426,559, filed on Dec. 23, 2010.

(51) Int. Cl.
*G07F 19/00* (2006.01)

(52) U.S. Cl.
USPC .......................................... 235/379

(58) Field of Classification Search
USPC ............................. 235/379; 705/64
See application file for complete search history.

*Primary Examiner* — Jamara Franklin
(74) *Attorney, Agent, or Firm* — Black, McCuskey, Souers & Arbaugh, LPA (57) ABSTRACT

An automated banking machine operates to cause financial transfers responsive to data read from data bearing records. The automated banking machine includes a card reader operative to read card data from user cards corresponding to financial accounts. The automated banking machine also includes a display and a printer to produce records of financial transactions carried out with the machine. The machine is operative to cause a computer determination to be made that the card data corresponds to an authorized machine user. The automated banking machine may also include a storage device that is operative to unlock a secured area including information thereon that is used by the automated banking machine to carry out financial transfers.

20 Claims, 6 Drawing Sheets

BANKING SYSTEM CONTROLLED REPONSIVE TO DATA BEARING RECORDS

CROSS REFERENCE TO RELATED APPLICATIONS

This application is a continuation in part of U.S. patent application Ser. No. 12/802,496 filed Jun. 8, 2010, which is a continuation of U.S. application Ser. No. 11/421,120 filed May 31, 2006, which is a continuation-in-part of U.S. application Ser. No. 10/746,276 filed Dec. 26, 2003, which claims benefit of U.S. provisional Application Nos. 60/436,883 filed Dec. 26, 2002; 60/436,784 filed Dec. 26, 2002; 60/436,780 filed Dec. 26, 2002; 60/436,882 filed Dec. 26, 2002; 60/436,779 filed Dec. 26, 2002; 60/436,719 filed Dec. 26, 2002; 60/436,908 filed Dec. 26, 2002; 60/436,832 filed Dec. 26, 2002; 60/436,831 filed Dec. 26, 2002 and 60/487,754 filed Jul. 15, 2003. U.S. application Ser. No. 11/421,120 also claims benefit under 35 U.S.C. 119(e) of U.S. provisional Application Nos. 60/687,132 filed Jun. 3, 2005; 60/687,176 filed Jun. 3, 2005; 60/687,175 filed Jun. 3, 2005; 60/687,268 filed Jun. 3, 2005; 60/687,263 filed Jun. 3, 2005; 60/687,131 filed Jun. 3, 2005; and 60/687,571 filed Jun. 3, 2005. This application also claims benefit under 35 U.S.C. 119(e) of U.S. provisional Application No. 61/426,559 filed Dec. 23, 2010. All of these references are hereby incorporated herein by reference in their entirety.

TECHNICAL FIELD

This invention relates to automated banking machines that operate to cause financial transfers responsive to data read from data bearing records and which may be classified in U.S. Class 235, Subclass 379.

BACKGROUND

Automated banking machines may include a card reader that operates to read data from a bearer record such as a user card. The automated banking machine may operate to cause the data read from the card to be compared with other computer-stored data related to the bearer or their account. The machine operates in response to the comparison determining that the bearer or account corresponds to an authorized system user to carry out at least one transaction which is operative to transfer value to or from at least one account. A record of the transaction is also commonly printed through operation of the automated banking machine and provided to the user. A common type of automated banking machine used by consumers is an automated teller machine which enables customers to carry out banking transactions. Banking transactions carried out may include the dispensing of cash, the making of deposits, and/or the transfer of funds between accounts and account balance inquiries. The types of banking transactions a customer can carry out are determined by the capabilities of the particular banking machine and the programming of the institution operating the machine.

Other types of automated banking machines may be operated by merchants to carry out commercial transactions. These transactions may include, for example, the acceptance of deposit bags, the receipt of checks or other financial instruments, the dispensing of rolled coin, or other transactions required by merchants. Still other types of automated banking machines may be used by service providers in a transaction environment such as at a bank to carry out financial transactions. Such transactions may include for example, the counting and storage of currency notes or other financial instrument sheets, the dispensing of notes or other sheets, the imaging of checks or other financial instruments, and other types of service provider transactions. For purposes of this disclosure an automated banking machine or an automated teller machine shall be deemed to include any machine that may be used to electronically carry out transactions involving transfers of value.

Automated banking machines may benefit from improvements.

OBJECTS OF EXAMPLE EMBODIMENTS

It is an object of an example embodiment to provide a banking system apparatus that is operated responsive to data bearing records.

It is an object of an example embodiment to provide an automated banking machine.

It is an object of an example embodiment to provide an automated banking machine at which a user may conduct banking transactions.

It is a further object of an example embodiment to provide an automated banking machine which has improvements.

Further objects of example embodiments will be made apparent in the following Detailed Description of Example Embodiments and the appended claims.

The foregoing objects are accomplished in example embodiments with an automated banking machine that is operative responsive to data bearing records to cause financial transactions to be carried out. The automated banking machine may include a computer having at least one processor (referred to herein as the computer processor). The automated banking machine may also include at least one storage device in operative connection with the computer processor. Such a storage device may correspond to a hard drive, solid state drive, or other non-volatile device that is operative to store information.

In this described example embodiment, the storage device includes at least one processor (referred to herein as the storage device processor). The storage device processor is operative to encrypt and decrypt information stored on the storage device, using a secret symmetrical encryption key (e.g., an AES key) securely stored/embedded in the storage device. In an example embodiment, the storage device may include one or more secured areas such as partitions (in which data stored thereon is encrypted with the secret symmetrical encryption key by the storage device processor).

The storage device drive is operative to be in different modes of operation in which security is enabled and disabled. When security is enabled, the storage device processor is operative to require receipt of an authentication key (e.g., a password and/or random number) from the computer processor to unlock the secured area. When the secured area is unlocked, the storage device processor is operative to provide read/write access for the secured area to the computer processor. Prior to being unlocked, the storage device processor is operative to maintain the secured area in a locked condition which prevents access to the encrypted data stored on the secured area. Also, when security is disabled, the storage device processor is operative to provide the computer processor with access to the data stored on the secured area without requiring receipt of the authentication key.

In this described example embodiment, the storage device may also include one or more unsecured areas such as partitions. The at least one processor is operative to enable access to the unsecured area by the computer processor, without the need for receipt of an authentication key.

The computer may include a motherboard that includes the computer processor. The motherboard may include device interfaces, ports, and any other components that enable the computer processor to communicate with the storage device processor. In an example embodiment, the motherboard includes a trusted platform module (TPM) (such as a TPM version 1.2 compatible processor). The computer processor may be operative to use the TPM to securely store and retrieve the authentication key from sealed storage for use with unlocking the secured area of the storage device drive.

The TPM may be operative to enable the computer processor to retrieve the authentication key from sealed storage, only after the TPM has been used to verify that predetermined components of the computer remain unchanged. Such predetermined components for example may include the BIOS firmware or other firmware that is used to initially boot the computer processor. Such predetermined components may also include the configurable settings of the BIOS or other firmware that boots the processor. Such predetermined components may also include the firmware and/or configurable settings of other components of the computer such as a storage device interface and a network interface. Further, such predetermined components may include a bootloader software component (which may include or be associated with one or more software component files) stored on a storage device that the BIOS or other firmware causes to be executed by the computer processor. The bootloader software component is stored on the unsecured area of the storage device. Thus the bootloader software component can be measured prior to unlocking the secured area of the storage device.

In this described embodiment, as the computer boots, the platform configuration registers (PCRs) of the TPM may be extended with measurements of the current predetermined components. If the current measurements extended in the PCR registers match corresponding extended measurements of the predetermined components when the authentication key was stored in sealed storage, then the TPM is operative to decrypt the authentication key for use with unlocking the secured area of the storage device drive.

Once the storage device is unlocked, the bootloader software component may be operative to validate and/or measure designated components (i.e., predetermined files, registry data) of an operating system and other software applications stored on the secured area. The designated components that are validated/measured may be determined from a policy file accessed by the bootloader software component.

Such a policy file may include a list of the designated components to validate/measure. The policy file may also include hashes for the designated components, which are used by the bootloader software component to validate current measurement of the designated components. The policy file may also include PCR indexes of the TPM which should be extended with measurements of the designated components. The policy file may also include the expected values of the PCRs after being extended with the measurement for the designated components. The policy file may further include specified actions to take for each designated component if the designated component is not valid. Also, the policy file itself may be digitally signed to enable it to be authenticated. Examples of actions that may be specified in a policy file and taken when a designated component does not produce a matching hash and/or measurement, may include halting the booting of the operating system and/or reporting the error in a log file/system.

Once the designated components listed in the policy file have been validated and/or measured, the bootloader may be operative to cause the computer processor to begin executing one of the designated components on the secured area that is operative to boot the operating system stored on the secured area. The booted operating system may then execute other security software (which may also be operative responsive to policy files and/or values in the PCRs) in order to validate further components of the operating system and/or automated banking machine software components (stored on the secured area) that are operative to execute and cause the automated banking machine to carry out financial transactions, such as dispensing cash, for users of the machine.

When the computer processor of the automated banking machine and/or the storage device processor shuts down and/or is rebooted, it should be appreciated that the storage device becomes locked again. As a result, the storage device processor is operative to require the computer processor to re-transmit the authentication key in order to unlock the secured area.

DETAILED DESCRIPTION OF EXAMPLE EMBODIMENTS

Figure 1:
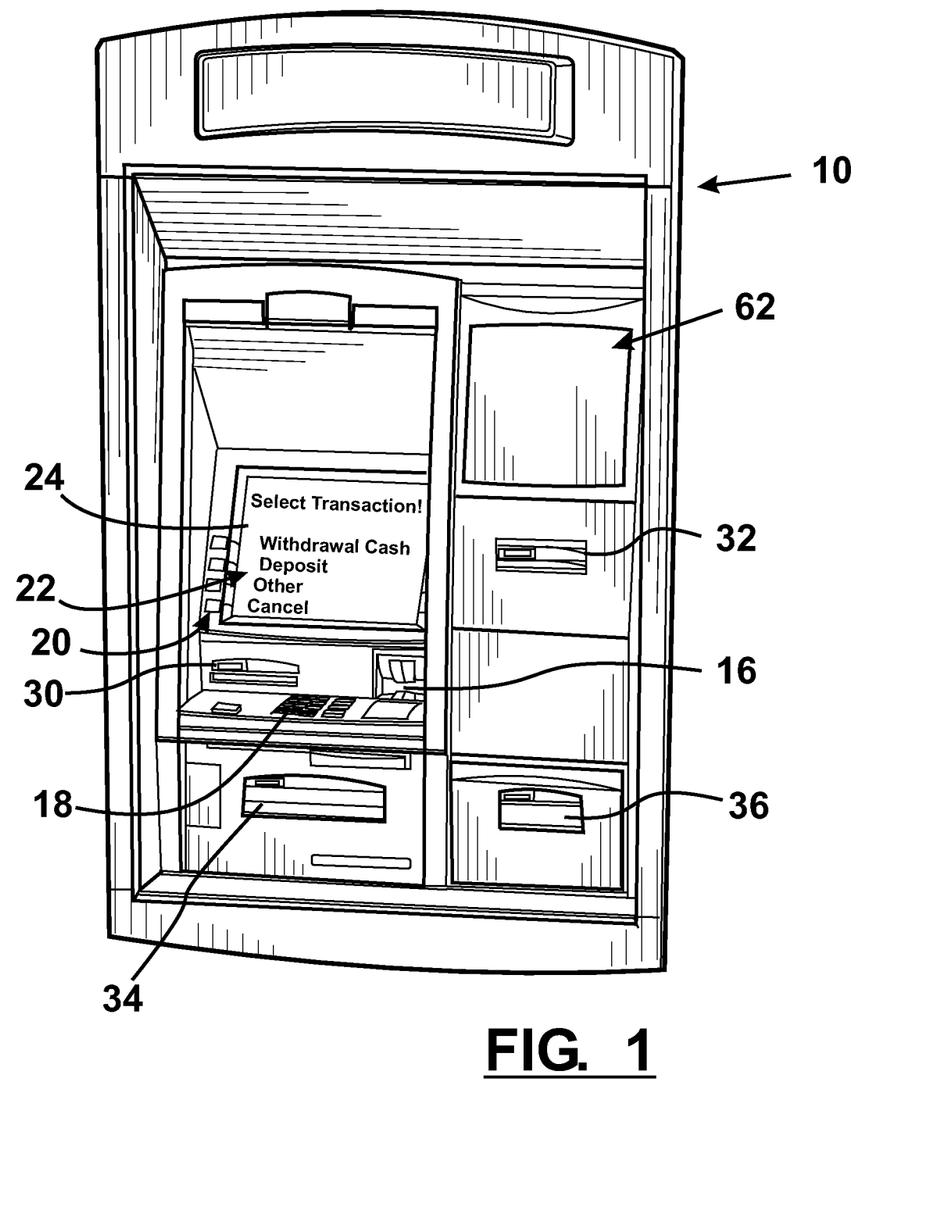
FIG. 1 is a front perspective view of an automated banking machine of an example embodiment.
Figure 2:
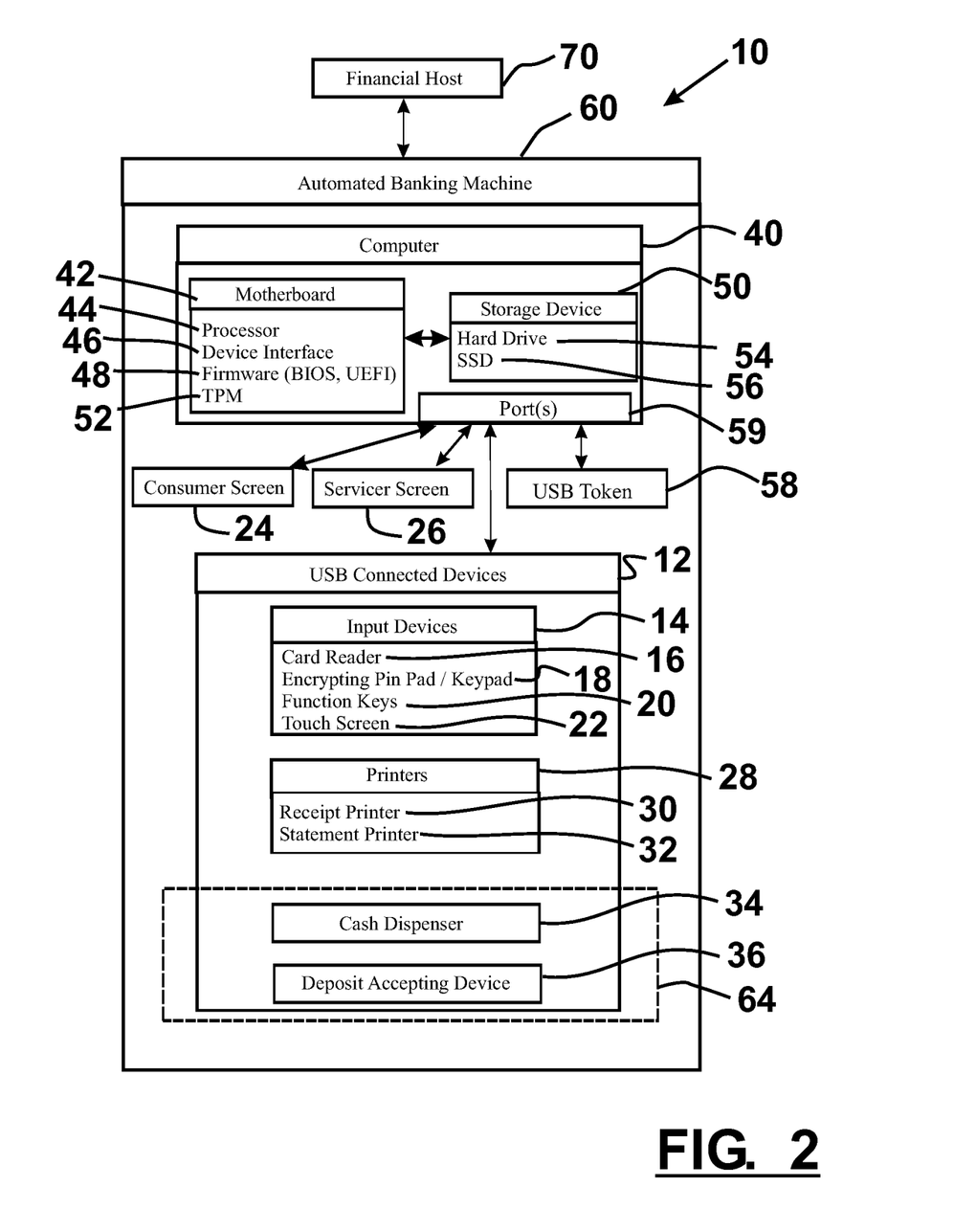
FIG. 2 is a schematic view of example components of an automated banking machine.

Referring now to the drawings, and particularly to FIGS. 1-2, there is shown therein an automated banking machine of a first example embodiment, generally indicated 10. In this example embodiment, automated banking machine 10 may correspond to an automated teller machine. The automated banking machine 10 includes a housing 60 (illustrated schematically in FIG. 2) and covered via a fascia 62 (illustrated in a perspective view in FIG. 1). The housing is used to house certain banking machine components (e.g., hardware devices) that facilitate carrying out banking transactions with the automated banking machine. Such components may include a plurality of input devices 14 that are operative to receive (from users) inputs of selections and data used by the automated banking machine in carrying out a banking transaction (e.g. transfer of value). In an example embodiment, such input devices may include a card reader 16. Card reader 16 is operative to read a customer's card which includes indicia thereon. The indicia may correspond to information about the customer and/or information about a customer's financial account, such as the customer's account number. In some embodiments the card reader 14 may be a card reader adapted for reading magnetic stripe cards and/or so called "smart cards" which include a programmable memory. In other embodiments, the card reader may read account data from cards (and/or mobile phones) wirelessly such as from radio frequency identification (RFID) cards (and/or NFC capable cards or mobile phones). Example embodiments may include features of the type discussed in U.S. Pat. No. 7,118, 031, the disclosure of which is incorporated herein by reference in its entirety.

Also in example embodiments, the automated banking machine 10 may include input devices such as input keys. Input keys may in some embodiments be arranged in a keypad 18 of an encrypting PIN pad (EPP). Input keys may alternately or in addition include keys in a QWERTY keyboard or function keys 20 or other types of physical keys or buttons for receiving manual inputs. Also, input devices may include a touch screen 22 with which a customer provides manual inputs adjacent a display screen 24. In addition, it should be understood that in various embodiments other types of input devices may be used such as biometric readers, speech or voice recognition devices, inductance type readers, infrared (IR) type readers, radio frequency type readers and other types of devices which are capable of receiving inputs from a person, article, or computing device and/or is capable of receiving information that identifies a customer and/or their account.

The example embodiment of the automated banking machine 10 also includes output devices that provide outputs to users. Such output devices may include one or more display screens such as the consumer display screen 24, which are capable of providing visible indicia to a customer. Some embodiments of an automated banking machine may include a secondary display screen such as a servicer display screen 26 that is capable of providing visible indicia to a service technician who provides service and maintenance for the automated banking machine. Such display screens may include an LCD, CRT or other type of display that provides visible indicia. In other embodiments, output devices may include devices such as audio speakers, radio frequency (RF) transmitters, IR transmitters or other types of devices that are capable of providing outputs which may be perceived by a user either directly or through use of a computing device, article or machine. It should be understood that embodiments may also include combined input and output devices such as the touch screen 22/display screen 24 combination which is capable of providing outputs to a user as well as receiving inputs.

In example embodiments of the automated banking machine 10, the output devices may also include one or more printers 28, such as a receipt printer 30 that is operative to print receipts for users reflecting transactions conducted at the machine. Embodiments may also include other types of printing mechanisms such as statement printer mechanisms 32, ticket printing mechanisms, check printing mechanisms and other devices that operate to apply indicia to media in the course of performing transactions carried out with the machine.

As illustrated in FIG. 2, the housing 60 of the automated banking machine 10 may further include a safe or chest 64 enclosing an interior area. The interior area inside the chest is used in the example embodiments to house critical components and valuable documents. Specifically in example embodiments, the chest may be used for housing currency, a cash dispenser 34, currency stackers, deposit accepting devices 36 and other banking machine components. For purposes of this disclosure a cash dispenser shall include any mechanism that makes currency stored within the machine accessible from outside the machine. The automated banking machine may include features of the type disclosed in U.S. Pat. Nos. 7,261,236; 7,240,829; 7,114,006; 7,140,607 and 6,945,526, the disclosures of each of which are incorporated herein by reference in their entirety. In example embodiments, the cash dispenser is operative to pick currency sheets from a stack of sheets housed in one or more canisters in the chest. The picked currency sheets may be arranged by a currency stacker mechanism for presentation through a delivery mechanism which operates to present a stack of notes or other documents to a customer.

Also, as illustrated in FIG. 2, the automated banking machine may include a computer 40 mounted inside the housing 60. The computer may include a motherboard 42 with at least one computer processor 44 mounted thereto. Such a computer processor for example may correspond to a 64-bit×86 based processor, or any other type of processor on which an operating system and automated banking machine software is capable of executing.

The motherboard may also include additional components that are used by the computer processor. Such components may include a plurality of device interfaces 46 that are operative to facilitate communication with devices placed in removable connection with the motherboard via ports 59 (to which the device or a cable connected to the device is connected). Such removable devices may include storage devices 50 (e.g., hard drive 54, solid state drive (SSD) 56), USB devices 12, 58, and display screens 24, 26.

The motherboard may also include a basic input/output system (BIOS) 48 having computer executable instructions in firmware that are executed when the motherboard and processor are booted (i.e., powered on and/or restarted) As used herein, the term BIOS is to be construed broadly to refer to a traditional PC BIOS firmware interface, an extensible firmware interface (EFI), a unified extensible firmware interface (UEFI), and/or any other type of component that includes code operative when the computer processor 44 is initially powered on to initialize the system and cause the computer processor 44 to execute software such as a bootloader software component.

In an example embodiment, the motherboard may also include a trusted platform module (TPM) 52 such as a Trusted Computer Group (TCG) TPM 2.1 compatible TPM. Examples of trusted platform modules used in automated banking machine are shown in U.S. Pat. No. 7,309,004 issued Dec. 18, 2007 and U.S. Pat. No. 7,922,080 issued Apr. 12, 2011, the disclosures of each of which are incorporated herein by reference in their entirety.

In an example embodiment, one or more of the previously described hardware devices (e.g., a storage device, a card reader, an EPP, a cash dispenser) is operative to use secret data (e.g., a password, authentication key, encryption key) to enable decryption and encryption of information by the hardware device in order to facilitate carrying out banking transactions. For example, the storage device may correspond to a hard drive (or a solid state drive (SSD)) having a processor that is operative to use a received authentication key to unlock access to encrypted information stored on the storage device such as files, software, or any other kind of data capable of being stored on the storage device. Also for example, an EPP is operative to receive at least one DES key that is used by a processor in the EPP to encrypt personal identification numbers (PINs) inputted into the EPP by a user.

In an example embodiment, the TPM 52 may be used by the computer processor 44 to store secret data (usable by at least one hardware device) in an encrypted data store such as a sealed storage (e.g., an encrypted data file). In addition, the TPM 52 may be used by the computer processor 44 to decrypt the secret data from the encrypted data store (e.g., sealed storage). The decrypted secret data may then be communicated by the at least one computer processor 44 to the at least one hardware device (e.g., storage device, card reader, EPP, cash dispenser) for use with enabling the at least one hardware device to at least one of decrypt and/or encrypt the information (e.g., stored data/files, card data, PINs, keys, measurements, digital signatures).

As used herein, sealed storage corresponds to a capability of a TPM to protect information by binding it to a known configuration of at least one predetermined component (e.g. BIOS firmware, bootloader, data files, operating system files) included in the automated banking machine. The configuration of a predetermined component corresponds to data such as the specific bytes associated with software/firmware executable code, configuration data, registry data and/or the contents of a file.

For example, the TPM may be used to store the previously described secret data (such as an authentication key for unlocking a storage device) in sealed storage such that the authentication key is encrypted in a file bound to the specific configuration states of the BIOS, bootloader, and/or other predetermined components at the time the sealed storage was generated. The TPM will only decrypt the authentication key if the current configuration of the predetermined components match the configuration of the predetermined components when the authentication key was originally stored in sealed storage.

A TPM typically includes a plurality (e.g., 24) of platform configuration registers (PCRs) which are each operative to store data. When the computer and TPM are booted, the PCRs are initialized to a known value (e.g., zero). As the computer boots, the value(s) of one or more of the PCRs will be extended with measurements (e.g. hashes) of the configuration of predetermined components associated with the computer.

Figure 4:
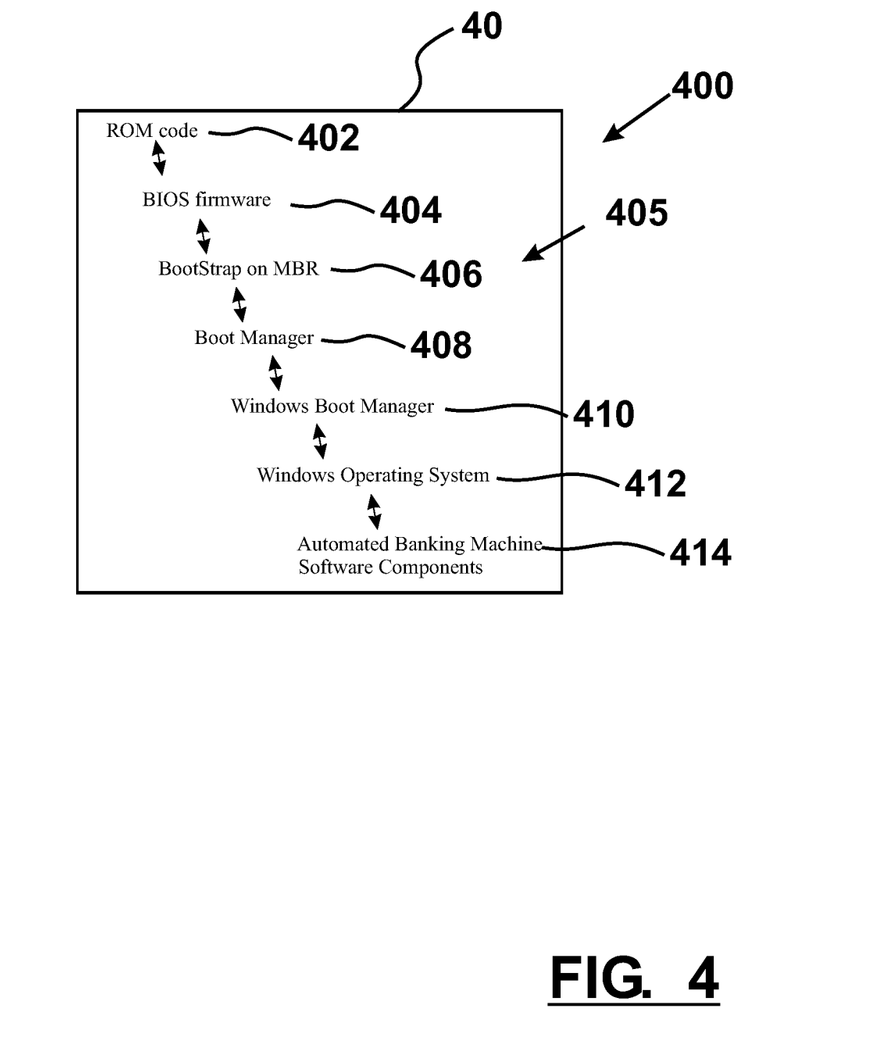
FIG. 4 is a schematic view illustrating an example order that predetermined components of an automated banking machine may be measured and/or exected.

FIG. 4 illustrates an example flow diagram 400 of a progression of predetermined components that are measured and are executed in the computer processor 44 of the automated banking machine. For example, when first booted, the motherboard of the computer of the automated banking machine may include a TPM compatible ROM code 402 that measures the BIOS firmware 404 and causes the TPM to store a one-way hash of the measurement in one or more of the PCRs of the TPM. Such a measurement may correspond to calculating a one-way hash of the BIOS firmware and invoking a PCR-Extend function of the TPM with the hash. Such a function causes the TPM to calculate a one-way hash value of a concatenation of the provided measurement and the existing contents of the specified PCR. The specified PCR is then updated with the TPM calculated hash value.

The ROM code may then cause the BIOS to execute. The TPM compatible BIOS firmware may be operative to measure at least a portion of a bootloader software component 405 stored on a storage device. Such a bootloader software component may include a bootstrap code 406 stored in a master boot record (MBR) (e.g. the first 512 bytes of storage device) and/or additional portions/stages of the bootloader (such as a boot manager 408) that are executed by the bootstrap code or other stage of the bootloader 405. For example, the measurement made by the BIOS may correspond to calculating a one-way hash of the bootstrap code 406 and invoking the PCRExtend function of the TPM with the hash. Here the PCRExtend function may be invoked to cause the TPM to calculate a one-way hash value of a concatenation of the provided measurement and the existing contents of a specified PCR (which may be the same PCR used to extend the measurement of the BIOS). The specified PCR is then updated with the TPM calculated hash value.

The BIOS 404 may then cause the bootstrap code 406 to execute. The bootstrap code 406 may be operative to execute further bootloader portions/stages such as a boot manager 408 and/or other software components. The bootstrap code 406 may also be operative to measure (if not already measured by the BIOS) the further bootloader portions/stages and call the PCRExtend function of the TPM to extend the measurement into a specified PCR of the TPM as discussed above, prior to causing the further bootloader stages and/or other software components to execute.

To carry out sealing an authentication key (or other secret data) into a sealed storage using the TPM, a software component (e.g., the bootloader manager or other utility) may be operative to invoke a Seal function of the TPM with the authentication key (or other secret data) as an argument and one or more indices of the desired current PCR value(s) to bind with the authentication key (or other secret data). The Seal function of the TPM causes the TPM to encrypt the authentication key (or other secret data) with its Storage Root Key. The output of the Seal function is an encrypted authentication key (or other encrypted secret data) along with an integrity-protected list of the index (indices) provided and the value(s) of the corresponding PCR(s) at the time the Seal function was invoked. The output of the Seal function may then be stored by the calling software component in a file on a storage device, a data store, a memory device, the TPM, or another location that will be accessible by the bootloader or other software component.

To retrieve the authentication key (or other secret data) at a later time, a software component (such as the bootloader) may invoke the Unseal function of the TPM with arguments that include the encrypted authentication key (or other encrypted data) and the integrity-protected list of the PCR index (indices)/value(s). The Unseal function of the TPM causes the TPM to verify the integrity of the list of PCR value(s) and then compare the verified PCR value(s) with corresponding current PCR value(s) stored in the TPM. Responsive to a match between the verified and current PCR value(s), the TPM is operative to decrypt the authentication key (or other secret data) and return the decrypted authentication key (or other secret data) to the calling software component.

If the current PCR value(s) do not match the verified PCR value(s) bound to the encrypted authentication key (or other secret data), then the TPM returns an error message and operates to refuse to decrypt the authentication key (or other secret data). Such a case may occur when any one of the BIOS, bootloader, and/or other measured software/data, has changed since the authentication key (or other secret data) was stored in sealed storage via use of the TPM. Thus, the authentication key (or other secret data) can only be retrieved from sealed storage for use by a hardware device in the automated banking machine when the BIOS, bootloader, and/or other measured software/data has not been altered since the authentication key (or other secret data) was stored in sealed storage.

Figure 3:
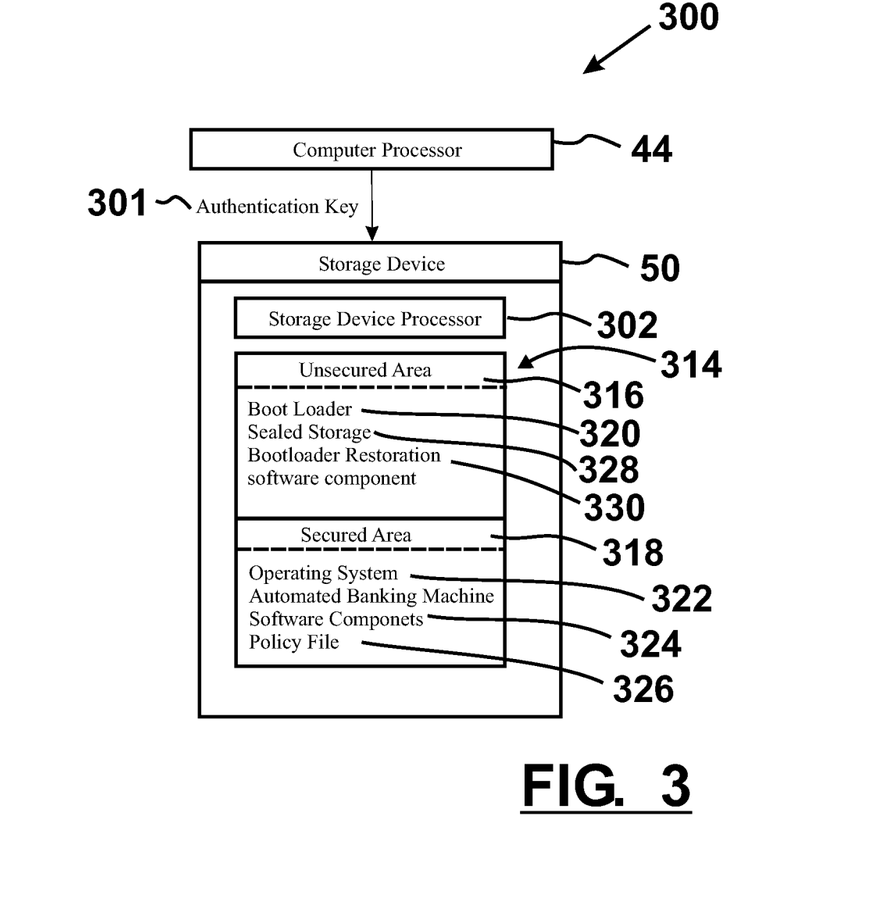
FIG. 3 is a schematic view illustrating an example storage device connected to a computer processor of a computer in an automated banking machine.

FIG. 3 shows an example of a storage device 50 in an automated banking machine 300 that is operative to use an authentication key 301 stored in sealed storage 328 for use with enabling the storage device to carry out encrypting and decrypting of information stored on the storage device. In this example, the storage device may correspond to a self-encrypting drive (SED) (e.g., a hard drive or solid state drive) that conforms to a TCG Opal SSC drive specification or other secure hard drive specification. Such storage devices may include at least one processor 302 operative to encrypt/decrypt information stored on the storage device. Such a storage device may include a plurality of storage areas 314 such as partitions (and/or bands) which segregate data stored on the storage device. As illustrated in FIG. 3, these different storage areas may include at least one unsecured area 316 and at least one secured area 318.

The storage device processor 302 is operative to encrypt the contents of data stored on the secured area 318 with an internal symmetrical key (e.g., such as an AES key). When security is enabled on the storage device, the storage device processor 302 is operative to provide access to the data in a secured area responsive to receiving the previously described authentication key. Such an authentication key places the storage device in an unlocked mode in which the storage device is operative to encrypt/decrypt data stored in the secured area for use with writing/reading data to/from the secured area responsive to the computer processor 44. Absent receiving the authentication key (to unlock the storage device), the storage device processor is operative to remain in a locked mode in which it does not decrypt/encrypt data stored in the secured area. As a result, the computer processor is unable to read and write data in the secured area of the storage device. Also it should be noted that the storage device processor 302 is operative to provide the computer processor with read and/or write access to the unsecured area 314 without the need for the authentication key. Also, it should be appreciated that the storage device may be placed in a mode in which security is disabled. In such a mode, the storage device processor may provide read/write access to data stored in the secured area without requiring an authentication key from the computer processor.

In this example embodiment, the computer executable instructions corresponding to the bootloader 320 (e.g., bootstrap code, boot manager) may be stored on the unsecured area 316 of the storage device. Thus, when the computer processor 44 is booted, the BIOS will have access to measure the bootloader 320 (or at least an initial portion or stage of the bootloader such as a bootstrap code) and cause a PCR of the TPM to be extended with the measurement of the bootloader. After the one or more stages of the bootloader 320 on the unsecured area are measured and executed, the execution of the bootloader instructions may be operative to invoke the previously described Unseal function of the TPM to decrypt the authentication key and send the decrypted authentication key to the storage device processor 302 for use with unlocking the secured area 318.

After the secured area 318 has been unlocked, the execution of the bootloader instructions may be operative to cause at least one processor to validate/measure at least a portion of the operating system software components 322 and/or automated banking machine software component files 324 stored in the secured area 318. In an example embodiment, the bootloader instructions (and/or security software executed by the operating system 322) may be operative to cause at least one processor to access one or more policy files 326. A policy file may list files, registry data, and/or other information that is stored in the secured area 318 (and/or the unsecured area 316) for the at least one processor executing the bootloader instructions to measure/verify. A policy file may further include corresponding information (such as one-way hashes of the files), PCR indexes to extend with measurements, and expected values of the PCRs extended with such measurements. A policy file may also include instructions that correspond to actions that may be taken by at least one processor responsive to the bootloader or other software instructions in response to a listed file, registry data or other data, that is determined to be invalid (based on the associated information stored in the policy file). The bootloader instructions (and/or other software) may be operative to cause at least one processor to validate the policy file as well. For example, the policy file may be digitally signed and the bootloader instructions may be operative to cause at least one processor to authenticate the digital signature using trusted public keys of a certificate authority and/or other trusted entity.

As shown in FIG. 4, a boot manager 408 portion of the bootloader 405 may be operative to cause at least one processor to measure/validate the files/data specified by the policy file such as an operating system boot manager 410 and/or selected files from the operating system 412 and automated banking machine software components 414. Once the specified files/data have been measured (and extended into one or PCRs) the boot manger 408 may be operative to cause an operating system boot manager 410 stored on the secured area 318 to boot in the computer processor 44. The operating system boot manager 410 may then cause the computer processor to boot the operating system 412, which causes the computer processor to execute the automated banking machine software components 414.

In example embodiments, the operating system 412 and automated banking machine software components 414 may also include security components operative to cause at least one processor to validate/measure additional portions of the operating system 412 and/or automated banking machine software components 414 (e.g., using policy files). In some embodiments, such security components may also be responsive to data in the PCRs and may be operative to cause at least one processor to further extend PCRs with the measurements made by the security components.

If all of the files/data measured responsive to the bootloader, and/or security software components are determined through operation of at least one processor to be valid, the automated banking machine may be operative to automatically place itself into a fully functional state that is operative to carry out banking transactions for users (e.g., dispensing cash). If one or more files/data are not valid (e.g., measurements do not match expected values), then the executable instructions of the bootloader, operating system, and/or security components of the automated banking machine may cause at least one processor to carry out actions responsive to rules specified in the policy file for each measured file or other data. Some rules associated with some measurements may be limited to causing a processor to issue a warning message in an event log, while other rules associated with some measurements may cause at least one process to operate to prevent an operating system from booting and/or may prevent an automated banking machine from entering into a mode that is operative to dispense cash and/or carry out other banking transactions. Also, rules associated with some measurements may cause at least one processor to cause at least one message regarding the invalid measurement to be communicated to a remote server.

As illustrated in FIG. 3, in an example embodiment the encrypted form of the authentication key (in sealed storage) may be stored as a file 328 on the unsecured area 316 along with the bootloader 320 (e.g., a boot manager and a bootstrap code in an MBR on the unsecured area), and any other software component included by or associated with the bootloader. However, it is to be understood that the unsecured area may correspond to more than one unsecured area such as multiple partitions. In such an embodiment, the bootloader 320, and/or the sealed storage file 328 may be stored on different partitions. Also, different partitions and/or bands of the unsecured area may be reserved for log files generated responsive to execution of the bootloader and/or other components. Policy files 326 may be stored on a secured area and may be accessed by at least one processor executing instructions included in the bootloader (or other component) after the secure area is unlocked by at least one processor executing the bootloader instructions. However it should be appreciated that in other embodiments other arrangements for storing files on unsecured and/or secured areas may be used. For example, is some embodiments, a boot policy file may be stored on an unsecured area. A measurement for such a policy file by execution of bootloader instructions may be required to enable the at least one processor executing the bootloader instructions to unlock the secure area of the storage device.

In an example embodiment, the boot manager portion of the bootloader instructions may include a user interface software component that when executed through operation of at least one processor causes the display screen of the automated banking machine to output visible indicia that prompts a user to enter information and/or select functions associated with the configuration of the automated banking machine and the operation of the machine responsive to the bootloader instructions. The bootloader may also include software modules that render at least one processor capable of interfacing with the storage device and/or other hardware devices installed in the automated banking machine. In addition, the bootloader may include software modules capable of causing at least one processor executing such instructions to interface with the TPM. An example of a bootloader that may be adapted to include these described features includes the GNU Grub application. Of course in other embodiments other instructions which cause computer performance of such instructions may be used.

In an example embodiment, the bootloader instructions are operative to cause at least one processor to automatically unlock the secured area and boot the operating system without user inputs, using the authentication key retrieved from sealed storage. However, an example embodiment of the bootloader may be operative to cause the at least one processor to interrupt the automatic booting of the operating system responsive to the detection of an input from a keyboard (or other input device) and/or the detection of a token device 58 (such as a USB token shown in FIG. 2) (or other type of wired/wireless portable device) that is connected to the computer 60 of the automated banking machine, and/or another type of input made by a person servicing the machine.

In an example embodiment, the bootloader instructions may cause at least one processor to take different actions depending on features of the token device 58 detected as being connected to the automated banking machine. For example, a first type of token device may correspond to a user token device assigned to a specific user (e.g., technician), which enables the automated banking machine to carry out two-factor authentication of the technician servicing the automated banking machine. When the automated banking machine boots (and an interrupting input is detected such as a key of a keyboard) the bootloader instructions may be operative to cause at least one processor to cause a display to output indicia that prompts a user to input a password. Such a password may be cryptographically bound to data stored in or able to be produced by the user token device. The bootloader and the user token device (such as via a processor and a data store in the token device) may then carry out an authentication protocol using the provided password that is operative to enable the at least one processor executing bootloader instructions to authenticate the user and the user token device.

Different user token devices, may be provisioned with different authorization levels, depending on the role of the assigned user of the respective token device. For example, data representative of an authorization level may be included in a digital certificate included in a data store on the token device. The boot manager instructions may cause at least one processor to cause a display of different available menu options depending on the authorization level determined by execution of the boot manager instructions based on the digital certificate on the user token device. Also, the boot manager instructions may be operative to cause at least one processor store in a log file in at least one data store, actions carried out by the execution of the boot manager instructions for different user tokens in order to audit changes to the automated banking machine.

In another example, a second type of USB token may correspond to a drive token device assigned to the specific storage device when the storage device is initially provisioned (e.g. configured for use in an automated banking machine). Such a drive token device may include an encrypted authentication key stored therein, which is usable to unlock the secured area(s) on the storage device. When the automated banking machine boots (and an interrupting input is detected such as a key of a keyboard) the bootloader instructions may be operative to cause at least one processor to operate to cause a display to output indicia that prompts a user to input a password. Such a password may be cryptographically bound to the drive token device. The bootloader instructions and the drive token device (such as via a processor and instructions in a data store in the token device) may then carry out an authentication protocol using the provided password that is operative to enable the at least one processor responsive at least in part to the bootloader instructions to acquire a decrypted authentication key from the drive user token. The execution of the bootloader instructions may then cause at least one processor to operate using the authentication key to unlock the secured area(s) on the storage device, without requiring an authentication key to be decrypted from a sealed storage using the TPM (as discussed previously).

In general, a user token device will not have an authentication key stored therein. Thus, in order to carry out certain actions that require an authentication key (e.g., unlocking a secured area), the at least one processor executing the bootloader instructions must acquire a copy of an authentication key. Such an authentication key may be acquired via execution of the bootloader as discussed previously from a sealed storage using the TPM.

However, prior to a storage device being paired to a motherboard of an automated banking machine (which pairing produces the sealed storage), the at least one processor executing the bootloader instructions will not be able to acquire an authentication key using the TPM. An example embodiment of the boot loader may thus require the user with the user token device to acquire an authentication key from another source such as the previously described drive token device. In an example embodiment, a user may place both the user token device and the drive token device in operative connection with the automated banking machine (e.g., via two USB ports) at the same time. The bootloader instructions may cause a display to output indicia that prompts the user to enter the passwords for each respective token device. As discussed previously the bootloader instructions may cause at least one processor to operate to retrieve the authentication key from the drive token device for use with unlocking a secured area. Also as discussed previously the boot manager instructions may operate to cause at least one processor to base the displayed menu items that are available for selection by the user based at least in part on the access level associated with the user token device.

The drive token device may be stored in a secure location with the automated banking machine such as in the chest/safe of the automated banking machine. The drive token device may also be stored in a secure location away from the automated banking machine.

In some cases an storage device may need to be serviced in a manner which requires a authorization key; however, an authorization key may not be available via the TPM or a drive token device. For example, the BIOS of the computer of the automated banking machine may have become corrupted, and thus the TPM is unable to be used to decrypt an authentication key from sealed storage. Also, the drive token device may not be accessible because a user authorized to open the safe of the automated banking machine may not be available.

In order to accommodate such circumstances, an example embodiment of the bootloader/boot manager instructions may be operative to cause at least one processor to generate a one time use authentication key based on a challenge/response mechanism. In an example embodiment, the bootloader, and/or boot manager may include instructions usable to provide a selectable option to generate and display challenge data (e.g., a set of numbers, letters and/or other characters), which can be communicated through operation of at least one processor in the machine to a remote service (via phone or inputs entered into a web page of a web server). Such challenge data may include randomly generated data (caused to be generated by the bootloader/boot manager instructions) and a drive ID such as a serial number (or other hardware ID of the storage device that is capable of being read by the at least one processor executing the boot loader instructions from the storage device). The challenge data may also include CRC (cyclic redundancy check) data calculated based on the other data included in the challenge data. In addition to causing at least one processor to cause the display of the challenge data, the bootloader/boot manager instructions may be operative to cause at least one processor to store the generated challenge data on the storage device. In an example embodiment the challenge data stored on the storage device may be encrypted using a key associated with the user token device.

The remote service may include a server including at least one processor and at least one operatively connected data store that includes stored secret data associated with the storage device (e.g., stored in correlation with the drive ID of the storage device). Such secret data may be stored in the data store of the remote service when the storage device was originally provisioned and at other times such as when a prior challenge/response mechanism was carried out for the storage device. The server may include software instructions operative to cause the server to acquire the challenge data (via a customer service user inputting the information with an input device into a user interface produced responsive to the server software; or via the web server to which the challenge data was entered into a web page). The server software may be operative to cause the server to operate to validate the challenge data (using the CRC data). The server software may also be operative to cause the server to operate to retrieve the stored secret data from the data store based at least in part on the serial number included in the acquired and validated challenge data.

The server may operate responsive at least in part to the retrieved stored secret data and the challenge data to generate response data and a CRC thereof which is appended to the response data. The server may be operative to cause the response data (with CRC data) to be displayed to a customer service user, which user can communicate the response data back to the user servicing the automated banking machine via phone. Alternatively the server may communicate the generated response data through a web page of the web server to the user servicing the automated banking machine. In addition, the server may be operative responsive to the server software instructions to update the data stored in the at least one data store to associate new secret data with the serial number (or other hardware ID) of the storage device. Such new secret data may correspond to the current challenge data or may be generated responsive to the current challenge data. The server software may also cause at least one processor to leave the prior secret data in the data store (at least until the next time when new challenge data is received for the storage device), in case the present challenge/response mechanism is not completed.

In an example automated banking machine, the bootloader/boot manager instructions may cause at least one processor to provide a selectable option that enables the user to input the response data and CRC data (via an input device of the automated banking machine, such as a keyboard or touchscreen). The bootloader/boot manager may also cause at least one processor to be operative to retrieve and decrypt the previously stored challenge data and may cause the at least one processor to validate the response data using the CRC data included with the response data. In addition the bootloader/boot manager may cause at least one processor to generate an authentication key for the storage device using the response data and the challenge data. The bootloader/boot manager instructions may further cause at least one processor to generate the authentication key responsive to the drive ID of the storage device. Also, the bootloader/boot manager instructions may further cause at least one processor to generate the authentication key responsive to selected random data previously saved on the storage device (e.g., stored when the storage device was originally provisioned for use in connection with an automated banking machine). The authentication key generated via this described challenge/response mechanism may then be used by execution of the boot manager instructions to cause at least one processor to unlock a locked secured area on the storage device.

If the unlocking of the secured area is successful, the bootloader/boot manager may be operative to cause at least one processor to configure the storage device to use a new authentication key (to unlock the secured area on the storage device based on a subsequent use of this described challenge response mechanism). The bootloader/boot manager instructions may cause at least one processor to be operative to generate the new authentication key responsive to the challenge key, serial number or other hardware ID of the storage device, and the predetermined random data saved on the storage device when the storage device was originally provisioned for use in connection with an automated banking machine.

In addition it should be appreciated that example embodiments may use other types of challenge/response mechanism to securely generate an authentication key usable to unlock a secure area on a storage device. For example an alternative embodiment of a challenge/response mechanism may use public key cryptography. In such an embodiment, challenge data may include the drive ID and a public key of the TPM. The response may include an encrypted authentication key that can only be decrypted using a private key by the TPM. In such alternative embodiments, the challenge data and the response data may be too long to communicate via phone. Thus the challenge data and the response data may be included in files that are communicated to/from the remote service using a secure web site. Of course in other example embodiments other ways of communicating such data may be used.

Also, it should be appreciated that example embodiments of the storage device may be operative responsive at least in part to more than one authentication key to unlock a secured area and carry out other actions with the storage device. Thus, the various authentication keys discussed previously (e.g. those associated with the TPM, drive token, and challenge/response mechanism) may be different keys and may be independently updated without effecting the ability of the other authentication keys to be used.

An example embodiment of the boot manager instructions may cause at least one processor to be operative to cause the machine to display a user interface menu that includes different user selectable options for configuring the storage device and carrying out other actions, responsive to the one or more token devices being authenticated, authentication levels of a user token device, and/or one time challenge/response actions. For example, some user token devices may enable the user selection of boot manager options for backing up and restoring data on the secured area of the storage device, but may not permit user selection of other options, such as installing a new storage device and pairing the new storage device to the computer motherboard. Other token devices provided to other users may permit full access to all of the functions provided by execution of the boot manager instructions, such as for example to engage in machine operation to repair, service, replace, and/or re-configure a storage device, install a new operating system, carry out diagnostics, update the bootloader itself, update policy files, and/or carry out other actions that may require updated measurements of changed components of the automated banking machine to be trusted so as to enable operation of such components in the machine.

Figure 5:
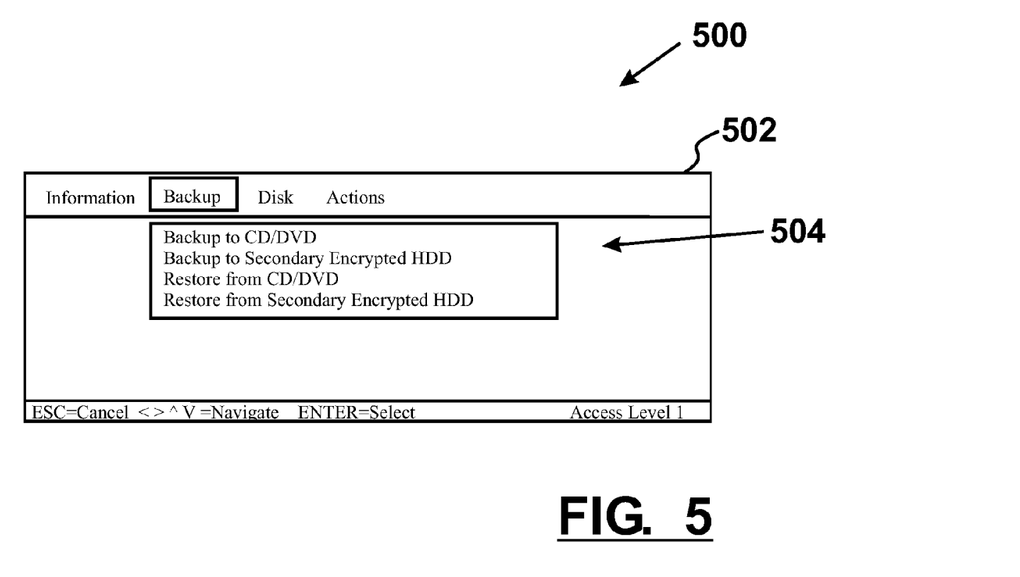
FIGS. 5 and 6 illustrate example views of user interfaces of a boot manager.
Figure 6:
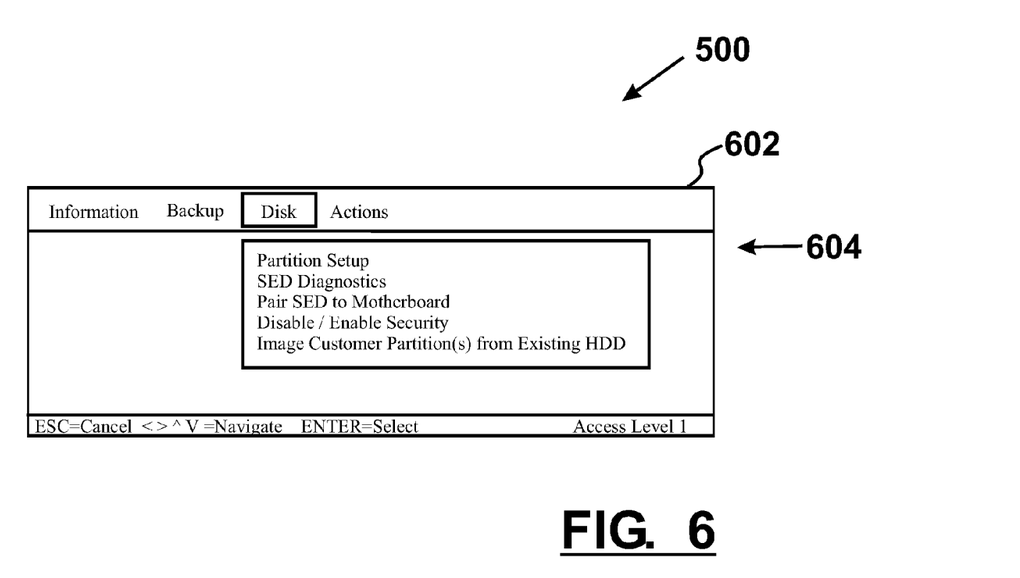

FIGS. 5 and 6 illustrate example embodiments of such user interfaces that may be generated on a display of the machine by at least one processor executing the boot manager portion of the bootloader instructions. However, it should be appreciated that alternative embodiments, may use other and/or different user interface screens, and menus in connection with options for configuration of a storage device and an automated banking machine.

As shown in FIG. 5, instructions of a boot manager 500 may cause at least one computer processor to cause a display device to output a user interface 502 with selectable backup actions 504 capable of being carried out responsive at least in part to the boot manager instructions. Such backup actions may include backing up the contents of a primary storage device to a CD, DVD, USB drive, a secondary storage device, or other data store. Such backup actions may also include restoring the backups from a CD, DVD or other data store back to the primary storage device. As used herein the primary storage device corresponds to the default storage device designated in the BIOS to be booted when the computer of the automated banking machine is powered on.

As shown in FIG. 6, instructions of the boot manager 500 may cause the at least one computer processor to cause the display device to output a user interface 602 with selectable disk actions 604 capable of being carried out responsive at least in part to the boot manager instructions. Such disk actions may include managing partitions such as deleting, and adding new partitions to the storage device. The disk actions may also include carrying out diagnostics on the storage device. In addition, the disk actions may include pairing a storage device to the motherboard of the at least one computer of the automated banking machine. In addition, such selectable disk actions may include disabling and enabling security capabilities associated with the storage device. Also, the disk actions may include copying an image of a customer's software stack (e.g., operating system and automated banking software components) to the secured area of the storage device from an existing storage device operatively connected to the at least one computer.

In an example embodiment, the pairing action may include creating a new sealed storage for encrypting the authentication key which is bound to current measurements of the BIOS, bootloader, and/or other configuration data of the at least one computer of the automated banking machine. Such a paring action is needed when a new storage device drive is being installed in an automated banking machine. Such a pairing action may also be needed when the BIOS and/or the bootloader has been updated by a user servicing the machine.

The disabling and enabling security actions carried out based on the boot manager instructions are operative to disable/enable security of the secured area. When security is disabled, the storage device processor does not require receipt of an authentication key from the computer processor to enable read/write access to the secured area. Disabling security may allow for easier installation of an operating system (which may require multiple re-boots of the computer) to the secured area (via a CD/DVD-based setup program).

The installation of such an operating system may overwrite the existing bootloader instructions on the MBR of the unsecured area with a bootloader of the newly installed operating system. In order to replace the operating system bootloader instructions on the MBR with a bootloader with the features described previously, an example embodiment may include a bootloader restoration software component 330 (shown in FIG. 3). The bootloader restoration software component 330 is operative to execute in the computer processor and causes the previously described bootloader instructions to be written to the MBR in place of the operating system bootloader instructions.

When the computer is re-booted, the bootloader instructions with the previously described boot manager instructions will execute and enable a user (via a suitable token device and associated passwords) to access the boot manager user interface. The boot manager user interface may then be used to carry out the action to enable security on the storage device, which will cause the storage device to again require an authentication key in order to unlock the secured area on the storage device. Although the bootloader restoration software component is shown on the unsecured area of the storage device, it is to be understood that such a bootloader restoration software component may be located in a different location such as the secured area, a USB flash drive, CD, or other media.

Example embodiments of the boot manager user interface may also enable a user (with a suitable access level associated with his/her user token device) to modify one or more of the policy files. In addition, when the automated banking machine boots, embodiments of the boot loader instructions may be operative to cause at least one processor to automatically modify a policy file based on a suitably digitally signed pending policy file stored on the storage device that is validated by execution of the bootloader instructions when the machine boots). Such pending policy files may be stored on the storage device using a diagnostic/configuration utility that runs in the booted operating system of the automated banking machine. Such pending policy files may also be downloaded from a remote server and stored on the storage device via configuration software automatically in response to messages from a remote server.

Also, in addition to the previously described policy files which list files, registry entries and other data to measure and validate, example embodiments may include other types of policy files. For example, a policy file that specifies levels of access required for access to different user interface options/ functions produced responsive to execution of the boot manager instructions may also be stored on the storage device. The at least one processor executing boot manager instructions may be responsive at least in part to data included in such a policy file to determine which user interface options/ actions to output and allow to be active and/or inactive based on the access level associated of a detected user token device.

Figure 7:
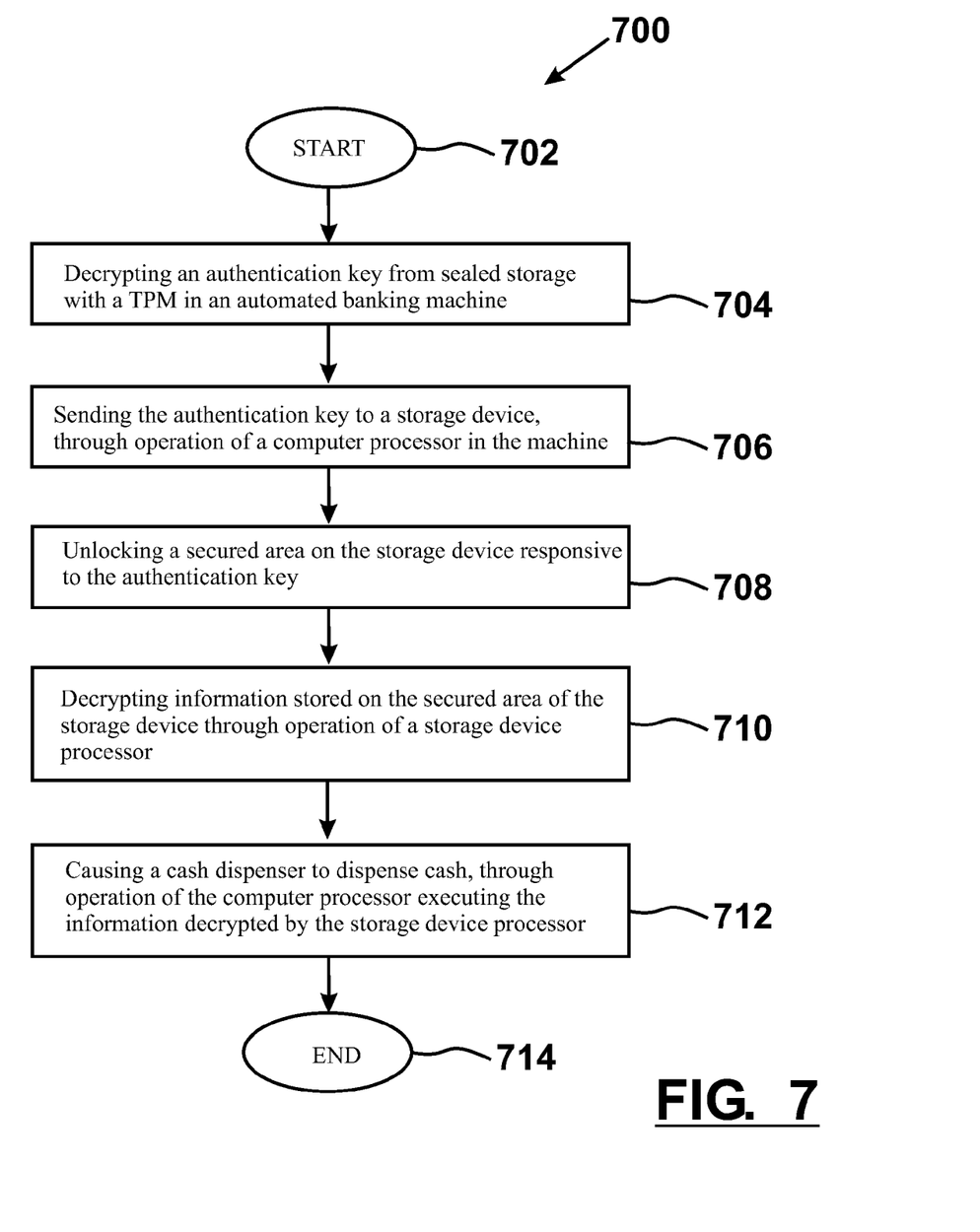
FIG. 7 illustrates an example method of using an authentication key decrypted from sealed storage to unlock a secured area on a storage device of an automated banking machine.

Automated banking machines with one or more of the features described previously may be operative to carry out methodologies involving use of TPM protected secret data, which data is used by one of the hardware devices in the automated banking machine to facilitate carrying out financial transactions. FIG. 7 illustrates a schematic representation of an example embodiment of such a method 700.

This method may begin at 702, and may include a step 704 of decrypting secret data such as an authentication key from sealed storage, through operation of the TPM and the at least one processor in the automated banking machine. As discussed previously, the TPM requires PCRs in the TPM to be extended with measurements in a manner that matches how the PCRs in the TPM were extended when the authentication key (i.e., secret data) was originally encrypted in the sealed storage.

The method may also include a step 706, of sending the authentication key decrypted by the TPM to at least one of the hardware devices in the automated banking machine. In this described example, the hardware device may include a data storage device. However, as discussed previously, in other embodiments, the hardware device that receives the secret data may correspond to another hardware device in the automated banking machine (e.g., EPP, card reader) that includes a data store therein.

At step 708, the example method may include through operation of at least one processor associated with the storage device responsive to the authentication key, enabling the at least one processor of the storage device to at least one of decrypt and encrypt information used by the automated banking machine to carry out financial transactions. This step 708 may correspond to unlocking at least one secured area on the storage area that includes encrypted information such as operating system and automated banking machine software components.

Once the secured area is unlocked, the method may include a step 710 of decrypting information stored on the secured area of the storage device through operation of the at least one storage device processor. The method may also include a step 712 of causing the cash dispenser to dispense cash (and/or carry out other financial transactions), through operation of the at least one computer processor executing the information decrypted by the at least one storage device processor. At 714 the example method may end. Also, it is to be understood that the described methodology may include additional and/or alternative steps which correspond to the functions and features described herein with respect to example embodiments of an automated banking machine.

In addition, it should be appreciated that the features and steps described previously with respect to storing and retrieving a key in sealed storage for use with a storage device may also be used with respect to other devices in the automated banking machine. For example, to enhance the security of information communicated between the at least one computer processor of the automated banking machine and a card reader (or other hardware device), an automated banking machine may be operative to store a symmetrical communication key in sealed storage. Such a communication key may retrieved from sealed storage when the automated banking machine boots via a boot loader in the same manner as discussed previously with respect to the authentication key for a storage device. The computer processor may then use the communication key and a compatible symmetrical cryptography algorithm (e.g. AES, triple DES) to decrypt data communicated (via USB messages or other types of device messages) from the card read (or other device) to the computer processor.

Examples of data that may be encrypted by a card reader, communicated to the computer processor, and decrypted by the computer processor include card data such as account information read from a user card by the card reader. In this described embodiment, the card reader may include a processor and a data store that includes the communication key stored therein. The processor of the card reader may be operative to encrypt the card data read from a user card using the communication key stored in the data store of the card reader and a suitable cryptography algorithm (e.g., AES, triple DES) prior to communicating the encrypted card data to the computer processor of the automated banking machine.

In an example embodiment, the boot manager instructions of the automated banking machine may cause at least one processor to cause a display on the machine to output a user interface with selectable menu options to carry out such functions associated with pairing a hardware device such as a card reader to the computer processor. Selection of such a menu option may cause the at least one processor to operate responsive to the boot manager instructions to create and/or store the same shared symmetrical communication key in the data store of the card reader and in a sealed storage accessible by the execution of the bootloader instructions of the automated banking machine. In some embodiments, the card reader may be operative to place itself in a mode that is capable of receiving a new or updated communication key in response to activation of an input device in operative connection with the at least one processor of the card reader. Such an input device may correspond to a button/switch on the card reader itself or a button/switch positioned elsewhere such as inside a chest/ safe of the automated banking machine.

The software applications and components described herein used in operating the automated banking machines and other components described herein may correspond to computer executable instructions (e.g., whether software or firmware). Such instructions may be resident on and/or loaded from computer readable media such as the storage device described herein or other articles of various types into the respective processors. For example, such computer executable software instructions may be included on and loaded from one or more articles of computer readable media such as hard drives, solid state drives, flash memory devices, CDs, DVDs, tapes, RAM, ROM and/or other local, remote, internal, and/or portable storage devices placed in operative connection with the automated banking machine and other systems described herein.

While the example embodiments include particular structures and components to achieve the desirable results, those having skill in the art may devise numerous other embodiments with other structures and components which employ the same principles described herein and which are encompassed by the subject matter as claimed.

In other example embodiments the principles associated with providing secure communications between at least one processor in the machine and at least one processor in a device within the machine may also be applied to secure communications between at least one processor in the machine and remote servers including at least one processor. Such examples may include encrypting stored data in at least one data store of the machine with a processor generated symmetric key. Such a generated symmetric key may be produced though operation of at least one processor. The symmetric key data may itself be encrypted via an asymmetric key, such as a private or public key, and stored in secure storage. Such an asymmetric key may include for example, a private key or a private and public key pair produced through operation of at least one processor and/or the TPM. Alternatively, the symmetric key may be encrypted using a public key received by the machine from a remote server. The encrypted symmetric key data may be stored in secure storage (e.g., sealed storage or other secure data store).

The machine may operate responsive to operation of at least one processor to communicate the data encrypted via the symmetric key to one or more remote servers. The at least one processor of the machine may further operate to cause the asymmetrically encrypted symmetric key data to be recovered from secure storage and sent to the remote server. In examples where the symmetric key was encrypted via a public key received by the banking machine from the remote server, the remote server may operate to use the corresponding private key to resolve the symmetric key. Alternatively, in cases where the symmetric key was encrypted using a private key generated or otherwise provided through operation of the banking machine, the corresponding public key may be communicated to the server, either in conjunction with or separate from the data encrypted with the symmetric key. Such data communication may itself be encrypted such as via SSL or other secure communication methodology when in transit between the banking machine and the remote server. The server may then resolve the symmetric key. Once the symmetric key is resolved it may be used to recover the data. Such data may include for example, journal data including transaction record data, check images corresponding to checks received in the machine, private machine user data, configuration data or other data that it is desired to store on the machine only in encrypted form.

Example embodiments may include features described in one or more of the following U.S. patents and applications, each of which are incorporated herein by reference in their entirety: U.S. application Ser. Nos. 13/324,288 filed Dec. 13, 2011; 13/066,272 filed Apr. 11, 2011; 13/068,592 filed May 16, 2011; 13/199,518 filed Sep. 1, 2011; U.S. Pat. Nos. 7,156,296; 7,156,297; 7,165,767; 7,004,384; 7,121,461; 7,131,576; 7,140,537; 7,140,607; 7,144,006; 7,000,832; 8,052,444; 7,044,366; 7,156,295; 7,137,551; 7,150,394; 7,021,521; 8,052,046; 6,264,101; 6,131,809; 7,147,147; 7,159,144; 7,162,449; 7,093,749; 7,039,600; 7,036,049; 7,003,492; 7,104,441; 7,163,144; 7,093,749; 6,953,150; 7,163,613; 7,819,309; 7,815,105; 7,798,395; 7,617,971; 7,604,164; 7,360,048; 7,334,723; 7,333,954; 7,316,349; 6,279,826; 5,984,178; 7,740,169; 8,047,429; 8,046,300; 8,042,734; 8,042,733; 8,038,057; 8,038,056; 8,061,593; 8,052,050; 8,052,043; 8,052,044; 8,052,051; 8,052,045; 8,052,046; 8,061,591; 8,052,049; 8,052,047; 8,052,048; and 8,052,041.

Thus, the example embodiments achieve at least some of the above stated objectives, eliminate difficulties encountered in the making and use of prior devices, solve problems, and attain the desirable results described herein.

In the foregoing description, certain terms have been used for brevity, clarity, and understanding. However, no unnecessary limitations are to be implied therefrom, because such terms are for descriptive purposes and are intended to be broadly construed. Moreover, the descriptions and illustrations herein are given by way of examples, and the invention is not limited to the exact details shown and described.

In the following claims, any feature described as a means for performing a function will be construed as encompassing any means capable of performing the recited function, and will not be deemed limited to the particular means shown as performing that function in the foregoing description or mere equivalents thereof.

Having described the features, discoveries, and principles of the invention, the manner in which it is constructed and operated, and the advantages and useful results attained; the new and useful structures, devices, elements, arrangements, parts, combinations, systems, operations, methods, and relationships are set forth in the appended claims.

We claim:

1. Apparatus comprising:
an automated banking machine that operates responsive at least in part to data read from data bearing records to cause financial transfers, wherein the automated banking machine includes a plurality of hardware devices including:
a card reader operative to read card data from user cards, wherein the card data corresponds to financial accounts;
a cash dispenser;
an encrypting PIN pad (EPP); and
at least one storage device;
at least one computer processor in operative communication with the card reader, the cash dispenser, the encrypting PIN pad, and the at least one storage device, wherein the at least one computer processor is operative to cause:
a computer determination to be made that card data read from a card corresponds to a financial account concerning which financial transfers are authorized to be conducted through machine operation; and
a financial transfer at least one of to the financial account, from the financial account, or a combination thereof, responsive at least in part to the determination;
a trusted platform module (TPM) in operative connection with the at least one computer processor,
wherein the TPM is operative to decrypt secret data from at least one sealed storage, wherein the at least one computer processor is operative to cause the secret data decrypted from the at least one sealed storage to be sent to at least one of the hardware devices, wherein the at least one hardware device is operative responsive at least in part to the secret data to enable the at least one hardware device to at least one of decrypt, encrypt, or a combination thereof, information used by the automated banking machine to cause financial transfers.

2. The apparatus according to claim 1, wherein the at least one sealed storage includes an encrypted file stored on the at least one storage device.

3. The apparatus according to claim 1, wherein the at least one hardware device that is operative responsive at least in part to the secret data, includes the at least one storage device, wherein the secret data includes an authentication key.

4. The apparatus according to claim 3, wherein the at least one storage device includes at least one storage device processor, wherein the at least one storage device includes at least one unsecured area and at least one secured area, wherein the at least one storage device processor is operative to use the authentication key to unlock the at least one secured area to enable the at least one computer processor to access information included in the at least one secured area, wherein the at least one storage device processor is operative to enable the at least one computer processor to access the information included in the at least one unsecured area when the at least one secured area is locked and prevented by the at least one storage device processor from being accessed by the at least one computer processor.

5. The apparatus according to claim 4, further comprising at least one bootloader software component stored on the at least one unsecured area, wherein the automated banking machine is operative to cause the at least one bootloader software component to execute in the at least one computer processor, wherein the at least one bootloader software component is operative to cause the TPM to decrypt the authentication key from the at least one sealed storage, wherein the at least one bootloader software component is operative to cause the authentication key decrypted by the TPM to be sent to the at least one storage device processor to cause the at least one secured area to be unlocked.

6. The apparatus according to claim 5, wherein the at least one computer processor is operative to use the TPM to generate at least one sealed storage that includes encrypted secret data, wherein the automated banking machine includes a plurality of predetermined components, wherein the predetermined components include at least one of a BIOS, an extensible firmware interface (EFI), a unified EFI (UEFI) or any combination thereof, wherein the predetermined components include the at least one boot loader software component, wherein the TPM includes a plurality of platform configuration registers (PCRs), wherein the motherboard is operatively configured to cause at least one of the PCRs to be extended with respective measurements of each of the respective predetermined components, wherein the at least one bootloader software component is operative to cause the TPM to decrypt the authentication key from the at least one sealed storage responsive at least in part to data stored in the at least one PCR, which data matches data previously stored in the at least one PCR when the at least one sealed storage was generated.

7. The apparatus according to claim 6, wherein the at least one secured area includes a plurality of encrypted operating system software components and a plurality of encrypted automated banking machine software components, wherein the at least one storage device processor is operative to decrypt the operating system software components and the automated banking machine software components included in the at least one secured area using a symmetrical key responsive at least in part to the at least one secured area being unlocked.

8. The apparatus according to claim 7, wherein the at least one bootloader software component is configured to execute in the at least one computer processor and cause the at least one computer processor to cause at least a portion of the operating system software components to be validated, and is operative to cause the at least one computer processor to initiate booting of at least one of the operating system software components by the at least one computer processor.

9. The apparatus according to claim 8, further comprising at least one policy file included in the at least one secured area, wherein the at least one policy file includes a list of software components to validate, wherein the at least one bootloader software component is configured to execute in the at least one computer processor to cause the at least one computer processor to cause at least one of the portion of the operating system software components, a portion of the automated banking machine software components, or a combination thereof to be validated responsive at least in part to the at least one policy file.

10. The apparatus according to claim 9, further comprising a bootloader restoration software component, wherein the bootloader restoration software component is configured to execute in the at least one computer processor to cause the at least one computer processor to write at least a portion of the at least one bootloader software component on a master boot record of the at least one storage device.

11. A method carried out in connection with an automated banking machine that operates responsive at least in part to data read from data bearing records to cause financial transfers, wherein the automated banking machine includes a plurality of hardware devices including:
- a card reader operative to read card data from user cards, wherein the card data corresponds to financial accounts;
- a cash dispenser;
- an encrypting PIN pad (EPP); and
- at least one storage device;
- at least one computer processor in operative communication with the card reader, the cash dispenser, the encrypting PIN pad, and the at least one storage device, wherein the at least one computer processor is operative to cause:
  - a computer determination to be made that card data read from a card corresponds to a financial account concerning which financial transfers are authorized to be conducted through machine operation; and
  - a financial transfer at least one of to the financial account, from the financial account, or a combination thereof, responsive at least in part to the determination;
- a trusted platform module (TPM) in operative connection with the at least one computer processor, wherein the method comprises:
a) through operation of the TPM, decrypting secret data from at least one sealed storage;
b) through operation of the at least one computer processor, causing the secret data decrypted by the TPM in (a) to be sent to at least one of the hardware devices in the automated banking machine;
c) through operation of the at least one hardware device responsive at least in part to the secret data sent in (b), enabling the at least one hardware device to at least one of decrypt, encrypt, or a combination thereof, information used by the automated banking machine to cause financial transfers.

12. The method according to claim 11, wherein the at least one sealed storage in (a) includes an encrypted file stored on the storage device.

13. The method according to claim 11, wherein the at least one hardware device that was sent the secret data in (b) corresponds to the at least one storage device, wherein the secret data includes an authentication key, further comprising:
d) through operation of the at least one storage device, decrypting information stored on the at least one storage device;
e) through operation of the at least one computer processor responsive at least in part to the information decrypted in (d), causing the cash dispenser to dispense cash.

14. The method according to claim 13, wherein the at least one storage device includes at least one storage device processor, wherein the at least one storage device includes at least one unsecured area and at least one secured area, wherein the at least one storage device processor is operative to enable the at least one computer processor to access information from the at least one unsecured area when the at least one secured area is locked and prevented by the at least one storage device processor from being accessed by the at least one computer processor, wherein (c) includes:
through operation of the at least one storage device processor responsive at least in part to the authentication key, unlocking the at least one secured area to enable the at least one computer processor to access the information included in the at least one secured area.

15. The method according to claim 13, wherein the automated banking machine includes a motherboard, wherein the motherboard includes the at least one computer processor, the TPM, and at least one of a BIOS, an extensible firmware interface (EFI), a unified EFI (UEFI), or a combination thereof, wherein the at least one unsecured area includes at least one bootloader software component, wherein the TPM includes a plurality of platform configuration registers (PCRs), further comprising:
- f) prior to (a) extending at least one of the PCRs with a measurement of the at least one bootloader software component and a measurement of the at least one of the BIOS, the EFI, the UEFI, or a combination thereof, wherein the at least one bootloader software component is operative to cause the TPM in (a) to decrypt the authentication key from the at least one sealed storage responsive at least in part to data stored in the at least one PCR, wherein in (b), the at least one bootloader software component is operative to cause the decrypted authentication key to be sent to the at least one storage device processor.

16. The method according to claim 15, wherein (d) includes decrypting a plurality of encrypted operating system software components and a plurality of encrypted automated banking machine software components included in the at least one secured area using a symmetrical key responsive at least in part to the at least one secured area being unlocked in (c).

17. The method according to claim 16, wherein the at least one secured area includes at least one policy file, wherein the at least one policy file includes a list of software components to validate, further comprising:
- g) prior to (e) through operation of the at least one bootloader software component executing in the at least one computer processor, causing at least one of a portion of the operating system software components, a portion of the automated banking machine software components, or a combination thereof included in the at least one secured area to be validated responsive at least in part to the at least one policy file;
- h) prior to (e) through operation of the at least one bootloader software component executing in the at least one computer processor, causing at least one of the operating system software components to be executed by the at least one computer processor.

18. The method according to claim 17, further comprising:
- i) through operation of a bootloader restoration software component executing in the computer processor, causing at least a portion of the at least one bootloader software component to be written to a master boot record of the storage device.

19. Apparatus comprising:
an automated banking machine that operates responsive at least in part to data read from data bearing records to cause financial transfers, wherein the automated banking machine includes a plurality of hardware devices including:
- a reader operative to read user data from data bearing records, wherein the user data corresponds to financial accounts;
- a cash dispenser;
- an encrypting PIN pad (EPP); and
- at least one storage device;

at least one computer processor in operative communication with the reader, the cash dispenser, the EPP, and the at least one storage device, wherein the at least one computer processor is configured to cause:
- a computer determination to be made that user data read from a data bearing record corresponds to a financial account concerning which financial transfers are authorized to be conducted through machine operation; and
- a financial transfer at least one of to the financial account, from the financial account, or a combination thereof, responsive at least in part to the determination;

a trusted platform module (TPM) in operative connection with the at least one computer processor, wherein the TPM is configured to decrypt secret data from at least one sealed storage, wherein the at least one computer processor is configured to cause the secret data decrypted from the at least one sealed storage to be sent to at least one of the hardware devices, wherein the at least one hardware device is operative responsive at least in part to the secret data to enable the at least one hardware device to at least one of decrypt, encrypt, or a combination thereof, information used by the automated banking machine to cause financial transfers.

20. The apparatus according to claim 19, wherein the at least one hardware device that is operative responsive at least in part to the secret data, includes the at least one storage device, wherein the secret data includes a key.

\* \* \* \* \*